(12) United States Patent
Purcell et al.

(10) Patent No.: US 10,731,565 B2
(45) Date of Patent: Aug. 4, 2020

(54) ADDITIVE MANUFACTURED OBJECT WITH SELF-BREAKING SUPPORT WITH FLUID PASSAGE

(71) Applicant: General Electric Company, Schenectady, NY (US)

(72) Inventors: Timothy James Purcell, Centerville, OH (US); Kassy Moy Hart, Greenville, SC (US); Heath Michael Ostebee, Easley, SC (US); Lucas John Stoia, Taylors, SC (US)

(73) Assignee: General Electric Company, Schenectady, NY (US)

( * ) Notice: Subject to any disclaimer, the term of this patent is extended or adjusted under 35 U.S.C. 154(b) by 764 days.

(21) Appl. No.: 15/384,725

(22) Filed: Dec. 20, 2016

(65) Prior Publication Data
US 2018/0171873 A1    Jun. 21, 2018

(51) Int. Cl.
*F02C 7/22* (2006.01)
*B33Y 80/00* (2015.01)
(Continued)

(52) U.S. Cl.
CPC ............ *F02C 7/222* (2013.01); *B22F 3/1055* (2013.01); *B33Y 80/00* (2014.12); *B22F 5/10* (2013.01);
(Continued)

(58) Field of Classification Search
CPC ......... F02C 7/222; B33Y 30/00; B33Y 50/02; B33Y 80/00; B22F 2003/1058
See application file for complete search history.

(56) References Cited

U.S. PATENT DOCUMENTS 5,595,703 A    1/1997  Swaelens et al.
6,397,922 B1 *  6/2002  Sachs ..................... B22C 9/00
                                              164/4.1
(Continued)

FOREIGN PATENT DOCUMENTS

EP        2963347 A1    1/2016
WO    2012131481 A1    10/2012
(Continued)

OTHER PUBLICATIONS

U.S. Appl. No. 15/384,735, Final Office Action dated Oct. 16, 2019, 10 pages.
(Continued)

*Primary Examiner* — Arun Goyal
(74) *Attorney, Agent, or Firm* — James Pemrick; Hoffman Warnick LLC

(57) ABSTRACT

An object includes a fluid chamber extending between a first surface and a vertically opposed second surface, the first surface including a fluid passage opening therethrough. A self-breaking support, initially configured to support the first surface, once broken creates a broken support disposed between the first surface and the vertically opposed second surface. The support includes: a base having a first end coupled to the first surface and a second opposing end. The first end of the base is wider than the second end, and a fluid passage extends through the first base for fluidly coupling the fluid chamber and the fluid passage opening in the first surface. A self-breaking link is disposed between the second opposing end of the first base and the second surface.

17 Claims, 8 Drawing Sheets

(51) Int. Cl.
  *B22F 3/105* (2006.01)
  *B33Y 30/00* (2015.01)
  *B33Y 50/02* (2015.01)
  *B22F 5/10* (2006.01)
(52) U.S. Cl.
  CPC ... *B22F 2003/1058* (2013.01); *B22F 2999/00* (2013.01); *B33Y 30/00* (2014.12); *B33Y 50/02* (2014.12); *Y02P 10/295* (2015.11)

(56) References Cited

U.S. PATENT DOCUMENTS

| | | | |
|---|---|---|---|
| 8,640,531 B2 | 2/2014 | Remillard et al. | |
| 10,488,047 B2* | 11/2019 | Ott | F23R 3/28 |
| 2011/0247590 A1 | 10/2011 | Donovan | |
| 2014/0092918 A1 | 4/2014 | Jost | |
| 2015/0093283 A1 | 4/2015 | Miller et al. | |
| 2016/0177834 A1 | 6/2016 | Patel et al. | |
| 2016/0222791 A1 | 8/2016 | Rogers | |
| 2017/0028651 A1 | 2/2017 | Versluys et al. | |

FOREIGN PATENT DOCUMENTS

| | | |
|---|---|---|
| WO | 2013155500 A1 | 10/2013 |
| WO | 2015053940 A1 | 4/2015 |
| WO | 2015108770 A1 | 7/2015 |
| WO | 2015112385 A1 | 7/2015 |
| WO | 2015147935 A1 | 10/2015 |

OTHER PUBLICATIONS

U.S. Appl. No. 15/384,735, Office Action dated Apr. 25, 2019, 11 pages.

* cited by examiner

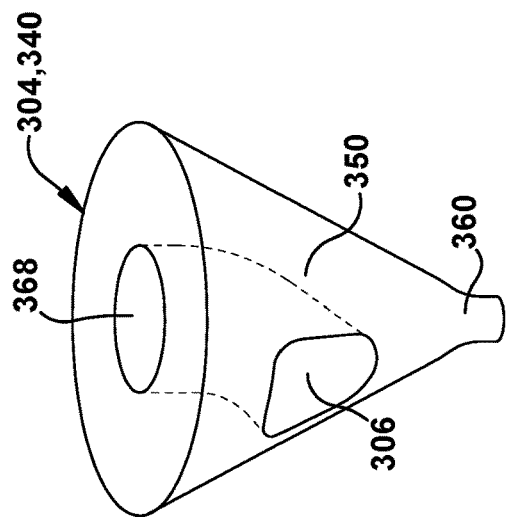
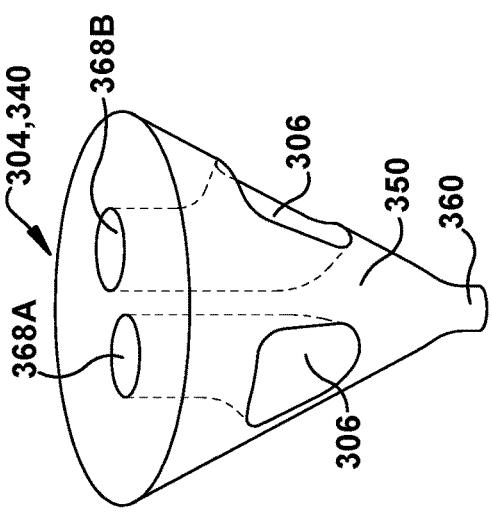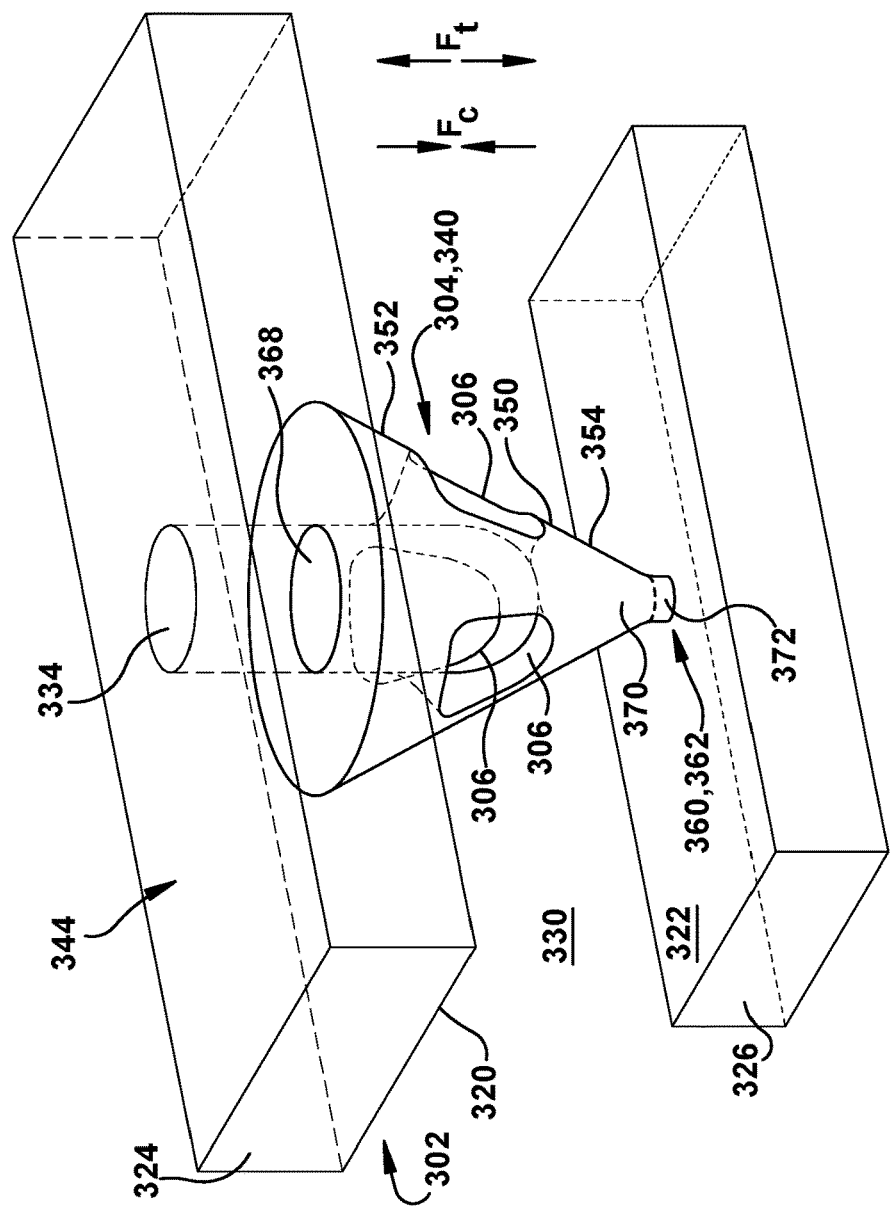

ADDITIVE MANUFACTURED OBJECT WITH SELF-BREAKING SUPPORT WITH FLUID PASSAGE

BACKGROUND OF THE INVENTION

The present disclosure generally relates to methods for additive manufacturing that utilize supports in the process of building an object, as well as novel self-breaking supports to be used within these AM processes.

Additive manufacturing (AM) processes generally involve the buildup of one or more materials to make a net or near net shape (NNS) object, in contrast to subtractive manufacturing methods. Though "additive manufacturing" is an industry standard term, AM encompasses various manufacturing and prototyping techniques known under a variety of names, including freeform fabrication, 3D printing, rapid prototyping/tooling, etc. AM techniques are capable of fabricating complex objects from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a metal powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional objects, prototypes and tools.

Selective laser sintering, direct laser sintering, selective laser melting, and direct laser melting are common industry terms used to refer to produce three-dimensional (3D) objects by using a laser beam to sinter or melt a fine metal powder. These processes may be referred to herein as metal powder additive manufacturing. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the metal powder material.

Metal powder additive manufacturing processes create layers of molten metal or an agglomeration of metal over already formed layers of hardened metal. Where the hardened metal is under the new layer, the hardened metal supports the new layer. One challenge of additive manufacturing is building surfaces that are not vertical such as unsupported horizontal surfaces or vertically angled surfaces, i.e., those angled relative to horizontal with no support therebelow. More specifically, where a portion of the new layer is not over a previously formed, now hardened metal, the non-heated metal powder thereabout provides insufficient support and gravity negatively impacts the object's final shape. In order to address this situation, during metal powder additive manufacture of a metallic object, it is known to also form supports as part of the metallic object to support the otherwise unsupported surfaces. For example, supports may be formed in fuel nozzles, such as those used in gas turbines, to maintain separation between parts, e.g., spaced, concentric tubular components in close proximity to one another. In many applications, the supports are removed from the final metallic object, e.g., where operation using the object does not allow for the presence of the supports or support breakage may cause other damage. In these situations, the supports are removed through post-AM processes such as machining or chemical processes. In some cases, supports built into the metallic object are allowed to remain in the object. In this case, stresses, such as thermal stress observed during operation of the metallic object, may be allowed to break the supports. The breakage may be allowed, for example, to improve operation by allowing for more freedom of movement during stresses observed within the object. It is difficult, in some applications, to ensure that the supports are configured to break during operation in a manner that does not otherwise impact the object. Another challenge is supporting surfaces where other structure in the surfaces, such as fluid passage openings, are present. In these instances, supports cannot be used because they interfere with the other structures. While these challenges have been described relative to metal powder additive manufacturing, they are also present in other forms of additive manufacturing.

BRIEF DESCRIPTION OF THE INVENTION

A first aspect of the disclosure provides an object, comprising: a fluid chamber extending between a first surface and a vertically opposed second surface, the first surface including a fluid passage opening therethrough; and a broken support disposed between the first surface and the vertically opposed second surface and initially configured to support the first surface, the broken support including: a first base having a first end coupled to the first surface and a second opposing end, a fluid passage extending through the first base for fluidly coupling the fluid chamber and the fluid passage opening in the first surface, and a link configured to couple the second opposing end of the first base and the second surface, the link being broken.

A second aspect of the disclosure provides a self-breaking support for a vertically opposed first and second surfaces of an object, the first and second surfaces defining a fluid chamber therebetween and the first surface including a fluid passage opening therethrough, the self-breaking support comprising: a base having a first end coupled to the first surface and a second opposing end, the first end being wider than the second end; a fluid passage extending through the base for fluidly coupling the fluid chamber and the fluid passage opening in the first surface; and a self-breaking link coupling the second opposing end of the base to the second surface.

A third aspect includes a self-breaking support for a vertically opposed first and second surfaces of an object, the first and second surfaces defining a fluid chamber therebetween and the first surface including a fluid passage opening therethrough, the self-breaking support comprising: a first base having a first end coupled to the first surface and a second opposing end, the first end being wider than the second end; a fluid passage extending through the first base for fluidly coupling the fluid chamber and the fluid passage opening in the first surface; a second base having a third end coupled to the second surface and a fourth opposing end, the third end being wider than the fourth end; and a self-breaking link coupling the second opposing end of the first base to the fourth opposing end of the second base.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 5 shows a perspective view of a self-breaking support according to embodiments of the disclosure.

FIGS. 6 and 7 show perspective views of self-breaking supports including alternative fluid passages according to alternative embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
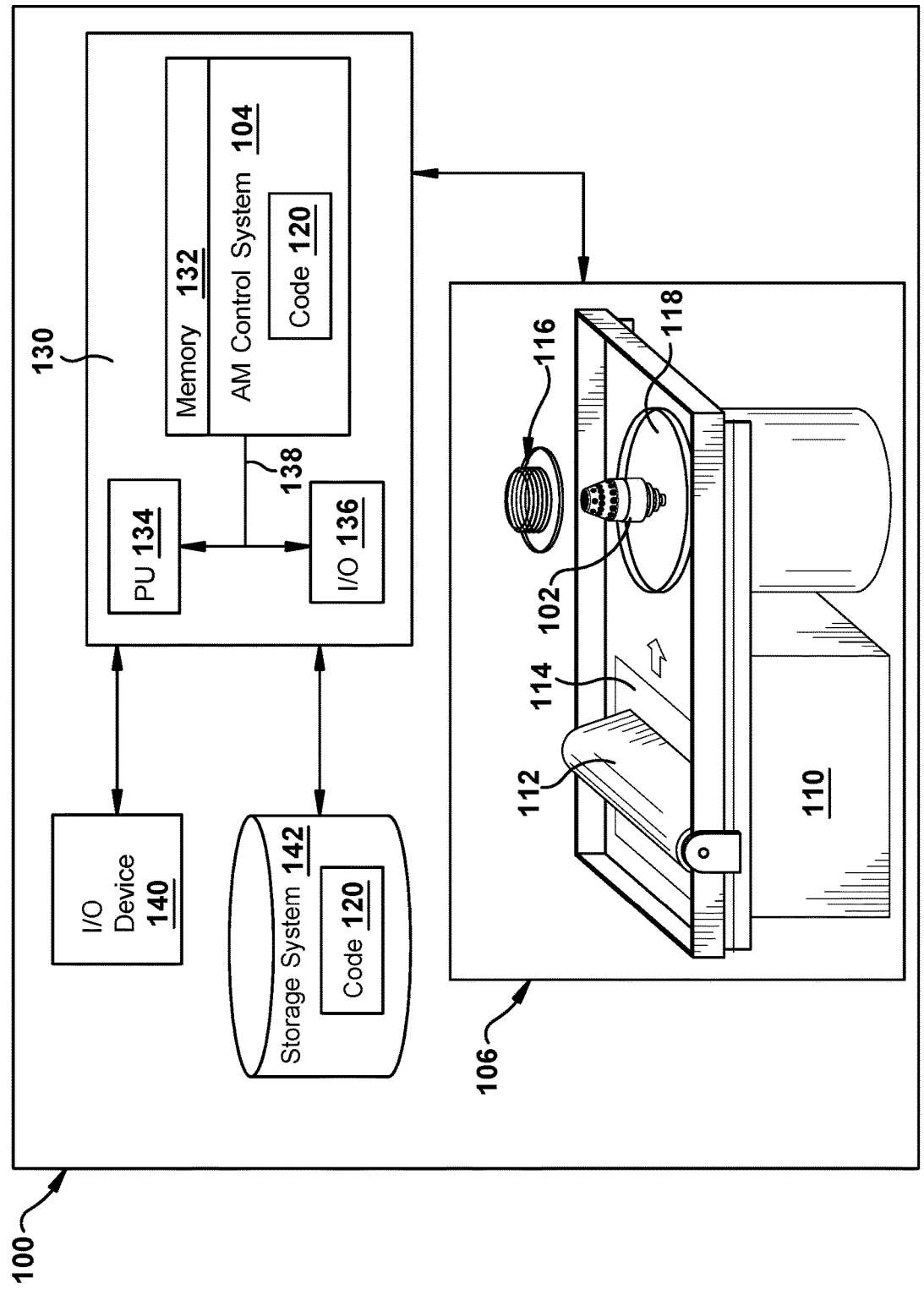
FIG. 1 shows a block diagram of an additive manufacturing process including a non-transitory computer readable storage medium storing code representative of an object according to embodiments of the disclosure.

As an initial matter, in order to clearly describe the current disclosure it will become necessary to select certain terminology when referring to and describing an object manufactured as described herein. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular object may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. A "metallic object" as used herein may include any material thing including a metal or metal alloy formed by a metal powder additive manufacturing process, and an "object" can include any material thing formed by additive manufacturing processes, perhaps using materials other than metal such as but not limited to polymers and ceramic composites. Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s). "Substantially parallel" may be +/−2° from being aligned. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or objects, but do not preclude the presence or addition of one or more other features, integers, steps, operations, elements, objects, and/or groups thereof. "Optional" or "optionally" means that the subsequently described event or circumstance may or may not occur, and that the description includes instances where the event occurs and instances where it does not.

As indicated above, the disclosure provides a self-breaking support for a vertically opposed first and second surfaces during additive manufacturing of an object, and in particular, a metallic object formed using, for example, metal powder or other additive manufacturing modalities. A method for manufacturing a metallic object is also described.

Figure 2:
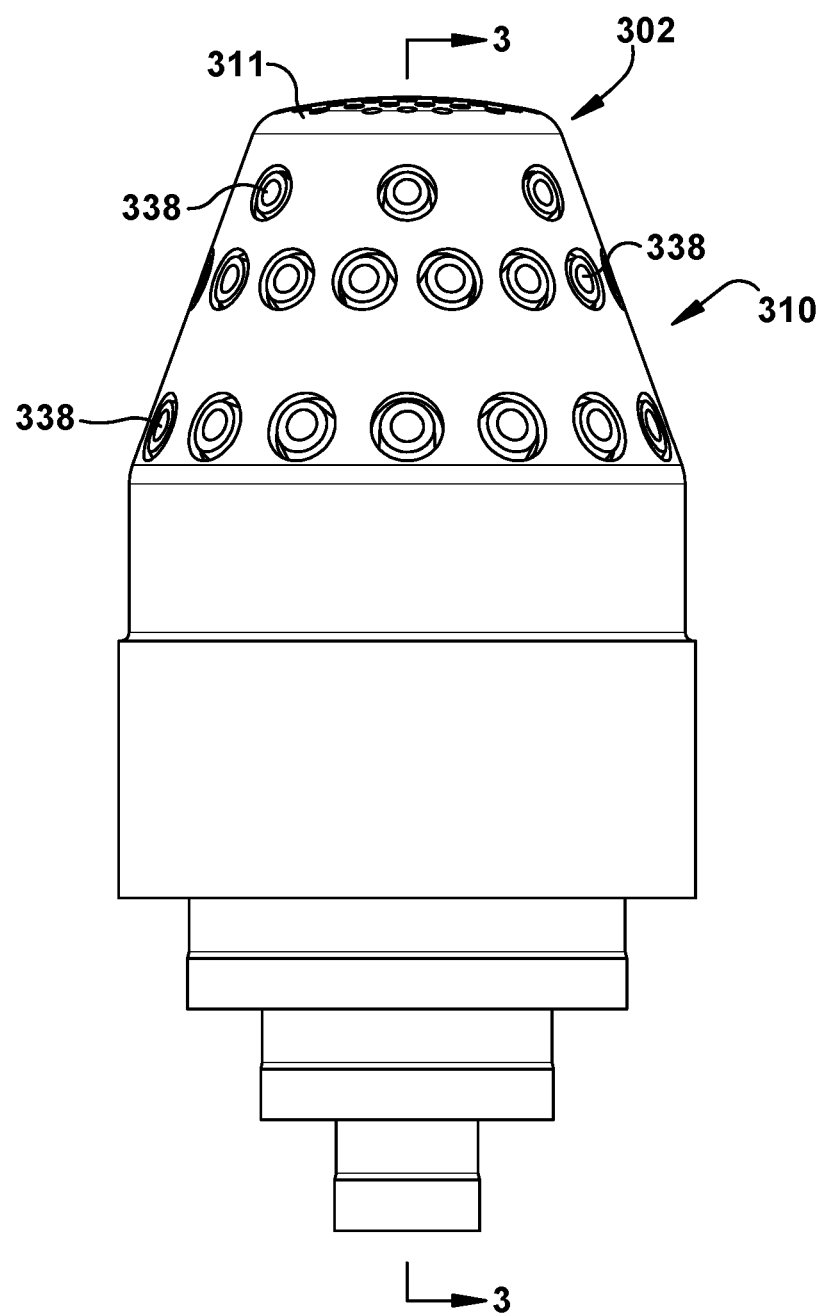
FIG. 2 shows a perspective view of an illustrative object including a self-breaking support including a fluid passage, according to embodiments of the disclosure.

To illustrate an example of an additive manufacturing process, FIG. 1 shows a schematic/block view of an illustrative computerized additive manufacturing system 100 for generating an object 102. In this example, system 100 is arranged for DMLM, one form of a metal powder additive manufacturing process. It is understood that the general teachings of the disclosure are equally applicable to other forms of additive manufacturing capable of forming a metal object. Object 102 is illustrated as an example fuel nozzle; however, it is understood that the additive manufacturing process can be readily adapted to manufacture any object. In some examples described herein, object 102 includes a fuel nozzle (FIG. 2). AM system 100 generally includes a computerized additive manufacturing (AM) control system 104 and an AM printer 106. AM system 100, as will be described, executes code 120 that includes a set of computer-executable instructions defining object 102 to physically generate the object using AM printer 106. Each AM process may use different raw materials in the form of, for example, fine-grain metal powder, a stock of which may be held in a chamber 110 of AM printer 106. In the instant case, object 102 may be made of metal or a metal alloy. As illustrated, an applicator 112 may create a thin layer of raw material 114 spread out as the blank canvas from which each successive slice of the final object will be created. In the example shown, a laser or electron beam 116 fuses particles for each slice, as defined by code 120. Various parts of AM printer 106 may move to accommodate the addition of each new layer, e.g., a build platform 118 may lower and/or chamber 110 and/or applicator 112 may rise after each layer.

AM control system 104 is shown implemented on computer 130 as computer program code. To this extent, computer 130 is shown including a memory 132, a processor 134, an input/output (I/O) interface 136, and a bus 138. Further, computer 130 is shown in communication with an external I/O device/resource 140 and a storage system 142. In general, processor 134 executes computer program code, such as AM control system 104, that is stored in memory 132 and/or storage system 142 under instructions from code 120 representative of object 102. While executing computer program code, processor 134 can read and/or write data to/from memory 132, storage system 142, I/O device 140 and/or AM printer 106. Bus 138 provides a communication link between each of the objects in computer 130, and I/O device 140 can comprise any device that enables a user to interact with computer 130 (e.g., keyboard, pointing device, display, etc.). Computer 130 is only representative of various possible combinations of hardware and software. For example, processor 134 may comprise a single processing unit, or be distributed across one or more processing units in one or more locations, e.g., on a client and server. Similarly, memory 132 and/or storage system 142 may reside at one or more physical locations. Memory 132 and/or storage system 142 can comprise any combination of various types of non-transitory computer readable storage medium including magnetic media, optical media, random access memory (RAM), read only memory (ROM), etc. Computer 130 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 132, storage system 142, etc.) storing code 120 representative of object 102. As noted, code 120 includes a set of computer-executable instructions defining object 102 that can be used to physically generate the object, upon execution of the code by system 100. For example, code 120 may include a precisely defined 3D model of object 102 and can be generated from any of a large variety of well-known computer aided design (CAD) software systems such as AutoCAD®, TurboCAD®, DesignCAD 3D Max, etc. In this regard, code 120 can take any now known or later developed file format. For example, code 120 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 120 may be translated between different formats, converted into a set of data signals and transmitted, received as a set of data signals and converted to code, stored, etc., as necessary. Code 120 may be an input to system 100 and may come from a part designer, an intellectual property (IP) provider, a design company, the operator or owner of system 100, or from other sources. In any event, AM control system 104 executes code 120, dividing object 102 into a series of thin slices that it assembles using AM printer 106 in successive layers of powder. In the DMLM example, each layer is melted or sintered to the exact geometry defined by code 120 and fused to the preceding layer. Subsequently, object 102 may be exposed to any variety of finishing processes, e.g., minor machining, sealing, polishing, assembly to another part, etc.

Figure 3:
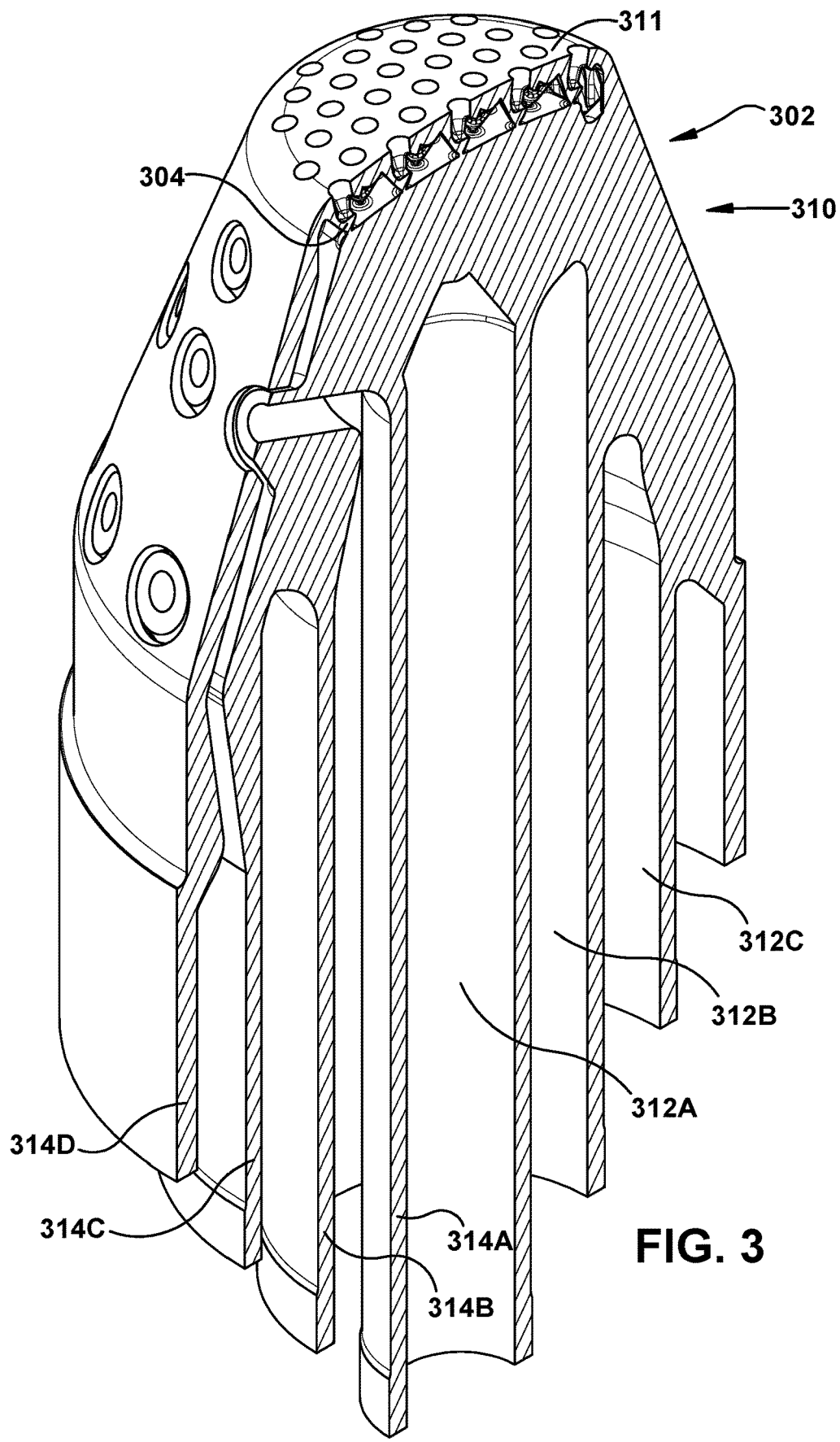
FIG. 3 shows a cross-sectional view of the illustrative object of FIG. 2 along line 3-3.

FIGS. 2 and 3 show another illustrative object 302 capable of employing a self-breaking support 304 (FIG. 3) including a fluid passage 306 (FIG. 5) according to the teachings of the disclosure. FIG. 2 shows a perspective view and FIG. 3 shows a cross-sectional view of object 302 in the form of a fuel nozzle system 310 that includes at least 3 concentric conduits 312A-C that extend to deliver their respective fluids, e.g., air or fuel, to or near an end 311 of system 310. Fuel nozzle system 310 can be manufactured using additive manufacturing such as a metal power additive manufacturing system 100 (FIG. 1) or other additive manufacturing system, depending on material used. Each fuel nozzle system 310 may include, for example, four concentric tubes 314A-D, creating concentric conduits 312A-C for fuel and air. It is emphasized that object 302 in the form of fuel nozzle system 310 is merely illustrative of an object including structure requiring a support that needs to allow fluid passage therethrough during additive manufacturing, and the teachings of the disclosure can be applied to any object similarly structured.

Figure 4:
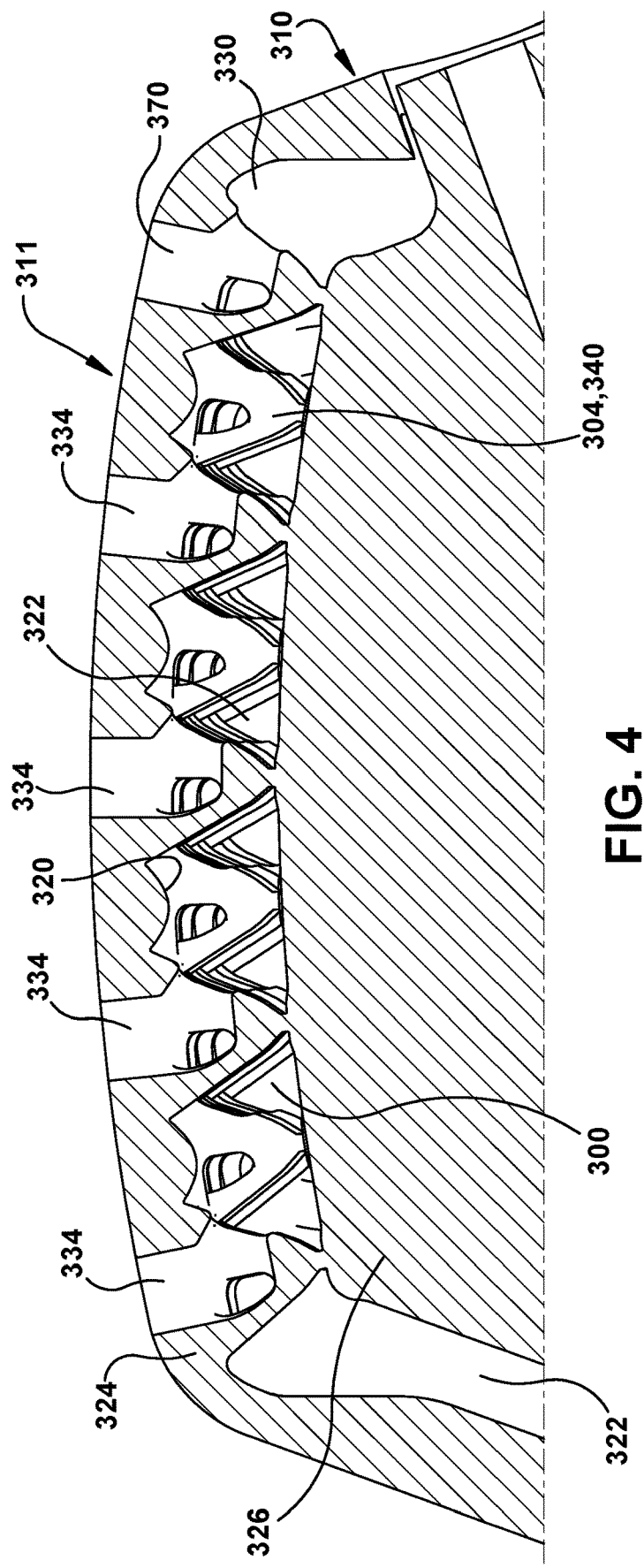
FIG. 4 shows an enlarged cross-sectional view of a portion of the illustrative object of FIG. 2.

As illustrated in the enlarged cross-sectional view of end 311 in FIG. 4, object 302 includes a first surface 320 that is vertically opposed to a second surface 322. In the example, where object 302 includes a fuel nozzle system 310, first surface 320 may be part of an outer wall 324 of fuel nozzle system 310, and second surface 322 may be part of an inner wall 326 of the fuel nozzle system. As noted herein, "vertically opposed" indicates that one surface includes at least a portion thereof vertically above at least a portion of the other surface. In the instant example, surfaces 320, 322 extends in a substantially parallel manner; however, surfaces 320, 322 may be angled relative to horizontal, as described herein, e.g., up to approximately 45° to form vertically angled surface(s).

As shown best in the enlarged cross-sectional view of end 311 of FIG. 4 and in the enlarged perspective view of FIG. 5, object 302 may include a fluid chamber 330 extending between first surface 320 and vertically opposed second surface 322. Fluid chamber 330 may include any form of opening or passage fluidly coupled to, for example, one or more conduits 312A-C (FIG. 3) via a coupling passage 332 (FIG. 4), for delivering a fluid. In the example shown, fluid chamber 330 couples to an outermost passage 312C, which may carry, for example, air for delivery through end 311. In any event, first surface 320 includes a fluid passage opening 334 therein through which a fluid needs to pass. In this situation, fluid passage opening 334 presents a challenge in providing supports for first surface 320 during additive manufacture because conventional supports may block the opening and prevent fluid flow, or would require a complicated removal process after manufacture. In accordance with embodiments of the disclosure, self-breaking support 304 includes fluid passage 306 therein such that fluid passage opening 334 in first surface 320 is in fluid communication with fluid chamber 330 even though self-breaking support 304 is present. That is, fluid delivered through fluid chamber 330 may be delivered through fluid passage 306 in support 304 to fluid passage opening 334. In the example shown, opening 334 extends through an outer wall 324 that includes first surface 320 as an inner surface thereof. (It is noted that in the illustrative fuel nozzle system 310, other openings 338 (FIG. 2) may deliver other fluids, e.g., fuel(s), from other conduit(s) 312A, B.) Each opening 334, 338 may include any now known or later developed orifice or nozzle for controlling dispersion of the fluid delivered therethrough. Once additive manufacture is complete, object 302 includes a broken support 340 disposed between first surface 320 and vertically opposed second surface 322. Broken support 340 is initially formed as self-breaking support 304. As will be described herein, broken support 340 is initially configured to support first surface 320, i.e., from falling during AM processes. As used herein, "broken" indicates that the relevant support 340 or link 362 thereof is either fractured, no longer in one piece or otherwise damaged so as to be at least impaired in being able to support the relevant structure.

Referring to FIG. 5, self-breaking support 304 may include a base 350 having a first end 352 coupled to first surface 320 and a second opposing end 354. As illustrated in FIG. 5, first end 352 of base 350 may be wider than second end 354. In one embodiment, shown in FIG. 5, base 350 has a substantially conical shape, i.e., tapering over from one location to another over its at least part of its length, or at least partially conical, with some variation to accommodate further structure described herein. As will be described herein, base 350 may have alternative shapes. Self-breaking support 304 also includes a self-breaking link 360 coupling second opposing end 354 of base 350 to second surface 322. Self-breaking link 360 is similar to a weakened zone, as described herein, and is configured to break under a particular tensile or compressive stress experienced by self-breaking support 304 during or after AM processes. Hence, self-breaking link 360 may include any manner of physical structure capable of causing the link to break under a desired stress. Self-breaking link 360 can include any variety of shapes, e.g., angles, radiuses, etc. Self-breaking link 360 becomes a broken link 362 (shown by phantom line) in the final object 302. Self-breaking link 360 (and broken link 362) as described herein may have any size allowing for breaking under a desired stress. In one embodiment, the link may have a widest horizontal dimension of no greater than 0.035 centimeters (0.014 inches). According to embodiments of the disclosure, in contrast to conventional techniques, self-breaking link 360 is configured to break on its own, i.e., without human intervention, due to thermal stresses experienced during metal powder AM. That is, the breaking of self-breaking supports 304 is realized by thermal stresses, which are accumulated by object 302 during absorption of the high amounts of heat from melting/sintering metal powder layers by laser/electron beam during the metal powder AM process. In particular, breaking of supports 304 most frequently takes place during the cooling phase of object 302 being manufactured. Shrinking of material during the cooling phase causes creation of tensile or compressive stresses, which result is thermal movement force. The force that causes the breakage can be a tensile force Ft and/or a compressive force Fc. In any event, this force breaks link 360. Self-breaking supports 304 do not need any additional treatment after removal of object 302 from AM system 100. Yet, self-breaking supports 304 are stable during the metal powder AM process, e.g., DMLM, and can readily support surfaces 320, 322. In this manner, self-breaking support 304 breakage during metal powder AM is in contrast to conventional supports that either break during operation of the object or must be removed or modified by, e.g., machining, after the AM process. Self-breaking supports 304 can remain in place.

In contrast to conventional supports, self-breaking support 340 also includes fluid passage 306 extending through base 350 for fluidly coupling fluid chamber 330 and fluid passage opening 334 in first surface 320. In this manner, self-breaking support 304 supports first and second surfaces 320, 322, but also allows fluid flow from fluid chamber 330 to fluid passage openings 334. Base 350 may include a plurality of fluid passages 306 therein extending through base 350 for fluidly coupling fluid chamber 330 and fluid passage opening 334 in first surface 320. In the example shown in FIG. 5, base 350 includes three circumferentially equally spaced fluid passages 306 within base 350. In this example, the three fluid passages 306 merge to a common exit 368, however, that is not necessary in all instances. It is emphasized, however, as shown in the perspective view of FIGS. 6 and 7, base 350 may include one (FIG. 6) or two (FIG. 7) fluid passages 306. In FIG. 7, fluid passages 306 each have their own respective exit 368A, 368B, which of course must mate with a single larger fluid passage opening 334 in first surface 320 or a number of fluid passage openings. More than three fluid passages may also be provided if space and flow dynamics allow.

Referring to FIG. 5 again, self-breaking support 304 is illustrated with a break (in phantom) therein, creating broken support 340 disposed between second opposing end 354 of base 350 and second surface 322. That is, self-breaking link 360 is now broken link 362 after tensile and/or compressive stresses act thereon. Broken link 362 may include a first portion 370 coupled to second opposing end 354 of base 350, and a second portion 372 coupled to the second surface 322, with the break somewhere in between or at least partially through one or more of the portions. In any event, broken support 340 provides little if any support between the surfaces. The stresses can be applied to link 360 during AM processes or thereafter. The stresses can be generated by natural cooling during the AM processes, or by application of other thermal loads, e.g., heating or cooling, to object 302 (FIG. 2) during or after the AM processes. In any event, broken link 362 may remain in object 302, i.e., it is left in object 302 after AM processes. Broken support 340, just as self-breaking support 304, includes base 350 having first end 352 coupled to first surface 320 and second opposing end 354, and fluid passage 306 extending through base 350 for fluidly coupling fluid chamber 330 and fluid passage opening 334 in first surface 320.

Referring to FIGS. 8-11, further alternative embodiments of object 302 and a self-breaking support will be described.

Figure 8:
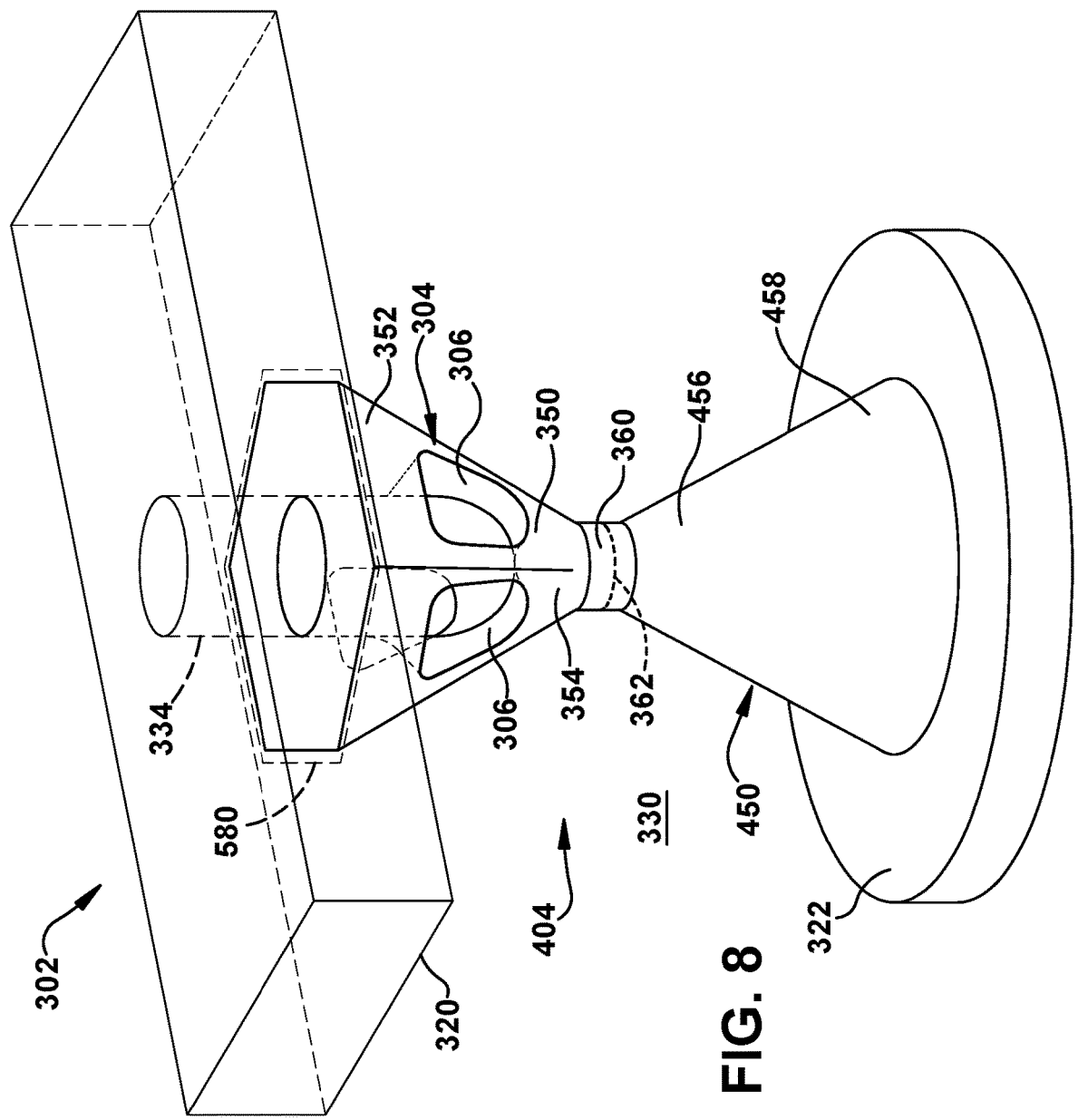
FIG. 8 shows a perspective view of a self-breaking support including a fluid passage according to another embodiment of the disclosure.

In one alternative embodiment shown in a perspective view in FIG. 8, an object 302 includes a self-breaking support 404 including the structure of self-breaking support 304, described herein, but also a second base 450 disposed between broken link 362 (self-breaking link 360) and second surface 322. More specifically, object 302 may include first base 350 having first end 352 coupled to first surface 320 and a second opposing end 354. As illustrated, first end 352 may be wider than second end 354. A fluid passage 306 extends through first base 350 for fluidly coupling fluid chamber 330 and fluid passage opening 334 in first surface 320. Similar to FIG. 4, first base 350 extends from first surface 320 towards second surface 322, and second base 450 extends from second surface 322 towards first surface 320. Second base 450 may include a first end 456 coupled to link 360, 362 and a second opposing end 458 coupled to second surface 322. That is, self-breaking link 360/broken link 362 couples second opposing end 354 of first base 350 to end 456 of second base 450. First end 456 of second base 450 may be narrower than second end 458 of the second base. That is, each of first base 350 and second base 450 may have a substantially conical shape. In this fashion, self-breaking support 450 has an hourglass shape. However, since second base 450 does not include a fluid passage therethrough, second base 450 may take on practically any shape capable of coupling to broken link 362.

Figure 9:
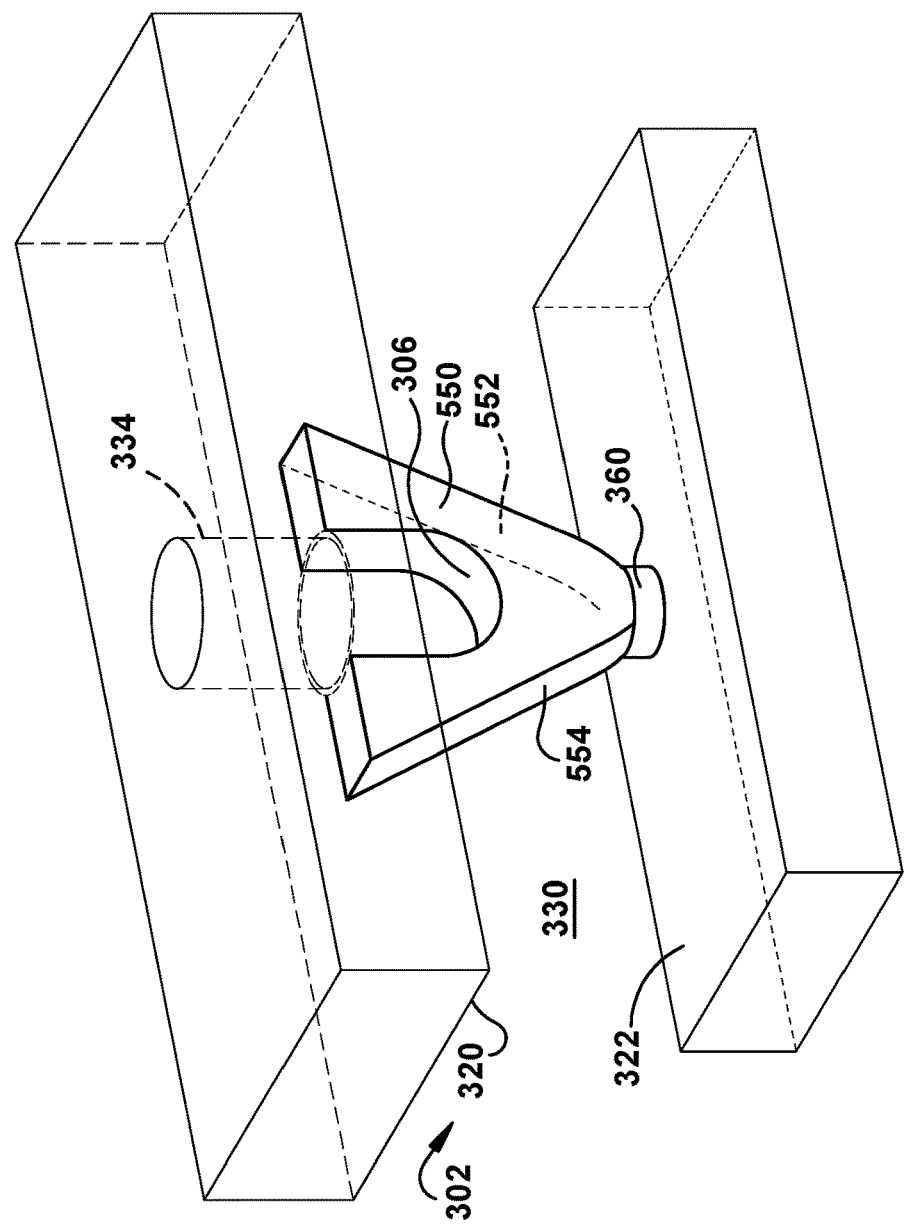
FIG. 9 shows a perspective view of a self-breaking support including a fluid passage according to yet another embodiment of the disclosure.

In another alternative embodiment, shown in a perspective view in FIG. 9, a base 550 may have a V shape. In this case, base 550 can be planar rather than conical, and the V-shape sides 552, 554 extend at 35-45° from horizontal.

Fluid passage 306 may pass from one or both sides of the planar base 550 to allow fluid communication between fluid chamber 330 and fluid passage opening 334.

Figure 10:
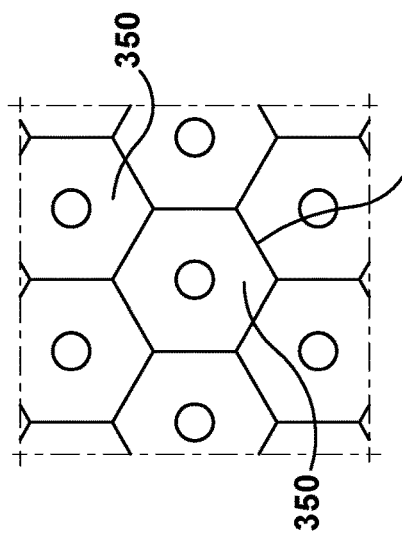
FIG. 10 shows a cross-sectional top view of a plurality of self-breaking supports according to another embodiment of the disclosure.

In another alternative embodiment, shown in a top view of a plurality of self-breaking supports in FIG. 2, in phantom in FIG. 8 and in FIG. 10, each base 350, 450 may have an outer surface 580 having a substantially hexagonal, horizontal cross-section. In this fashion, self-breaking supports 304, 404 can be positioned adjacent to one another in a spaced, organized manner, e.g., with a honeycomb cross-sectional arrangement. FIG. 10 shows a cross-sectional top view of a plurality of self-breaking supports 350 including hexagonal ends that mesh in a honeycomb fashion via hexagonal outer surfaces 580.

Figure 11:
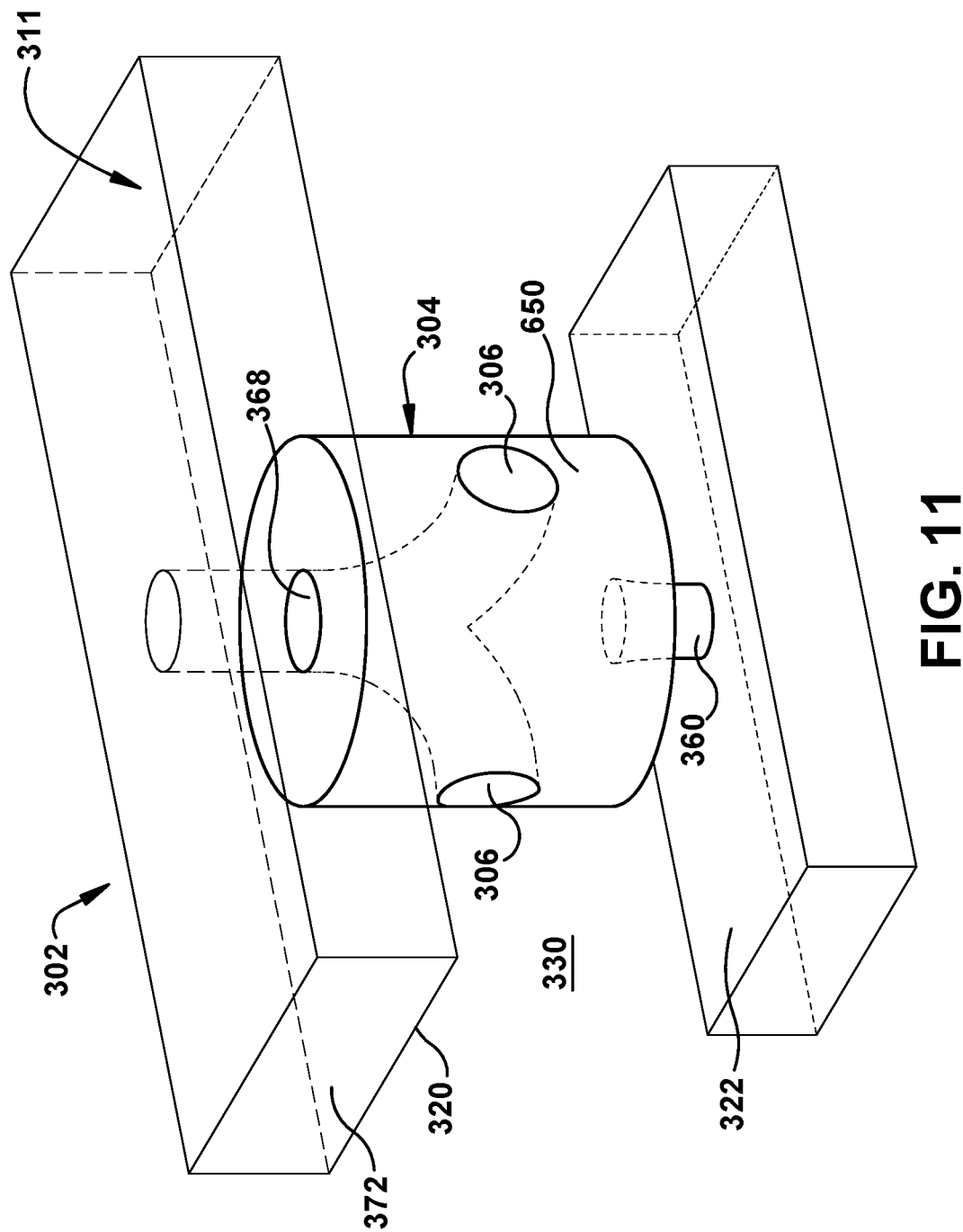
FIG. 11 shows a perspective view of a self-breaking support including a fluid passage according to yet another embodiment of the disclosure.

In another alternative embodiment, shown in a perspective view in FIG. 11, a base 650 may have a cylindrical or near cylindrical shape. In this case, fluid passage(s) 306 may extend to any of a number of locations to allow fluid communication between fluid chamber 330 and fluid passage opening 334.

In any of the embodiments of FIGS. 2-10, where a base 350, 450 has an angled outer surface, i.e., having a substantially conical shape or V-shape, the respective outer surfaces may have an angle relative to horizontal of no greater than 45°. In one embodiment, the angles may range from 35°-45°. As shown in FIG. 3, in an alternative embodiment, a base 650 may not have a first end wider than a second end thereof, and may have any block shape, e.g., a cylinder as shown.

While particular embodiments of the disclosure have been described herein, it is emphasized that teachings of each may be intermixed with other embodiments. For example, the FIG. 8 embodiment may include a V-shaped, upper base with a V-shaped, block (e.g., cylindrical) or conical lower base. In another example, relative to the FIG. 8 embodiment, first base 350 may have an outer surface having a substantially hexagonal, horizontal cross-section (shown in phantom), and second base 450 may have a substantially conical shape. Other aspects of each embodiment may also be intermixed within the scope of the disclosure.

Any number of self-breaking supports 304 may be employed within an object 302. Each self-breaking support 304, 404 can be added into code 120 (or any preceding or subsequent code format) for object 302 in any location desired, and can be printed along with object 302. As described herein, the FIGS. 2-11 embodiments, may be employed with a DMLM process. In this case, object 302 includes a metallic object, and the self-breaking link 360 (broken link 362) breaks under either a tensile force or a compression force applied during a metal powder additive manufacturing of the metallic object including the first and second surfaces 320, 322. It is emphasized, however, that the teachings of the disclosure may be applicable to other additive manufacturing processes, i.e., those not employing metal powder, as previously noted herein.

A method for manufacturing an object 302, and in particular a metallic object, according to embodiments of the disclosure may include forming object 302 with self-breaking support 304, 404, as described herein, using a metal powder additive manufacturing process (as in FIG. 1). The method may include allowing self-breaking link 360 to break during cooling of at least a portion of object 302 during the forming. The method may also include support 304 within object 302 such that it is present during use of the object.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A fuel nozzle, comprising:
a fluid chamber extending between an outer first surface and a vertically opposed inner second surface, the first surface including a fluid passage opening therethrough; and
support disposed between the first surface and the vertically opposed second surface and initially configured to support the first surface, the support including:
a first base having a first end coupled to the first surface and a second opposing end,
a fluid passage extending through the first base for fluidly coupling the fluid chamber and the fluid passage opening in the first surface, and
a link configured to couple the second opposing end of the first base and the second surface, the link being self-breaking link, wherein the support supports the first surface and the second surface and allows fluid flow from the fluid chamber to the fluid passage opening.

2. The object of claim 1, wherein the first end of the first base is wider than the second end first base.

3. The object of claim 1, wherein the support includes a second base disposed between the link and the second surface, the second base having a third end coupled to the link and a fourth opposing end coupled to the second surface, the third end of the second base being narrower than the fourth opposing second end of the second base.

4. The object of claim 1, wherein the first base has a V-shape.

5. A self-breaking support for a fuel nozzle, the fuel nozzle including an outer first surface and an inner second surface, the first surface and the second surface being vertically opposed, the first surface and the second surface defining a fluid chamber therebetween and the first surface including a fluid passage opening therethrough, the self-breaking support comprising:
a base having a first end coupled to the first surface and a second opposing end, the first end being wider than the second end;
a fluid passage extending through the base for fluidly coupling the fluid chamber and the fluid passage opening in the first surface; and
a link being self-breaking link coupling the second opposing end of the base to the second surface, wherein the self-breaking support supports the first surface and the second surface and allows fluid flow from the fluid chamber to the fluid passage opening.

6. The self-breaking support of claim 5, wherein the first surface and the second surface are substantially parallel.

7. The self-breaking support of claim 5, wherein the fluid passage includes a plurality of fluid passages therein extending through the base for fluidly coupling the fluid chamber and the fluid passage opening in the first surface.

8. The self-breaking support of claim 5, wherein the base has a substantially conical shape.

9. The self-breaking support of claim 5, wherein the base has an outer surface having a substantially hexagonal, horizontal cross-section.

10. The self-breaking support of claim 5, wherein the base has a V shape.

11. The self-breaking support of claim 5, wherein an outer surface of the base has an angle relative to horizontal of no greater than 45°.

12. The self-breaking support of claim 5, wherein the link has a dimension of no greater than 0.014 inches.

13. The self-breaking support of claim 5, wherein the fuel nozzle includes a metallic object, and the link breaks under either a tensile force or a compression force applied during a metal powder additive manufacturing of the metallic object including the first surface and the second surface.

14. A self-breaking support for a fuel nozzle, the fuel nozzle including a vertically opposed an outer first surface and an inner second surface, the first surface and the second surface defining a fluid chamber therebetween and the first surface including a fluid passage opening therethrough, the self-breaking support comprising:
   a first base having a first end coupled to the first surface and a second opposing end, the first end being wider than the second end;
   a fluid passage extending through the first base for fluidly coupling the fluid chamber and the fluid passage opening in the first surface;
   a second base having a third end coupled to the second surface and a fourth opposing end, the third end being wider than the fourth opposing end; and
   a link being self-breaking link coupling the second opposing end of the first base to the fourth opposing end of the second base, wherein the self-breaking support supports the first surface and the second surface and allows fluid flow from the fluid chamber to the fluid passage opening.

15. The self-breaking support of claim 14, wherein the fluid passage includes a plurality of fluid passages therein extending through the first base for fluidly coupling the fluid chamber and the fluid passage opening in the first surface.

16. The self-breaking support of claim 14, wherein each of the first base and the second base has a substantially conical shape.

17. The self-breaking support of claim 14, wherein the first base has an outer surface having a substantially hexagonal, horizontal cross-section, and the second base has a substantially conical shape.

\* \* \* \* \*